(12) United States Patent
Somogyvari et al.

(10) Patent No.: US 10,597,085 B2
(45) Date of Patent: Mar. 24, 2020

(54) MOTOR VEHICLE TRANSMISSION WITH PIVOTING LEVER FOR RAISING A BRAKE BOOSTER DURING A COLLISION

(71) Applicant: FORD GLOBAL TECHNOLOGIES, LLC, Dearborn, MI (US)

(72) Inventors: Istvan Somogyvari, Cologne (DE); Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/048,830

(22) Filed: Jul. 30, 2018

(65) Prior Publication Data
US 2019/0039588 A1 Feb. 7, 2019

(30) Foreign Application Priority Data
Aug. 1, 2017 (DE) .......................... 10 2017 213 212

(51) Int. Cl.
*B62D 21/15* (2006.01)
*B62D 25/08* (2006.01)
*B60L 3/00* (2019.01)
*B60T 17/00* (2006.01)
*B60T 7/06* (2006.01)

(52) U.S. Cl.
CPC .......... *B62D 21/152* (2013.01); *B60L 3/0007* (2013.01); *B60T 17/00* (2013.01); *B62D 25/082* (2013.01); *B60T 7/065* (2013.01); *B60Y 2306/01* (2013.01)

(58) Field of Classification Search
None
See application file for complete search history.

(56) References Cited

U.S. PATENT DOCUMENTS

| 4,266,630 A | * | 5/1981 | Nilsson | B60K 5/1208 180/291 |
| 6,041,674 A | * | 3/2000 | Kato | B60R 21/09 180/274 |

(Continued)

FOREIGN PATENT DOCUMENTS

DE 19501859 A1 7/1996

OTHER PUBLICATIONS

DE Examination Report DE 10 2017 213 212.4 Filed Mar. 14, 2018, 5 pages.

*Primary Examiner* — Drew J Brown
(74) *Attorney, Agent, or Firm* — Frank A. MacKenzie; Brooks Kushman P.C.

(57) ABSTRACT

A vehicle has a transmission and a brake booster disposed rearward of the transmission. A generally C-shaped lever is pivotingly mounted to the transmission and immediately adjacent to the brake booster such that a first arm of the lever is disposed forward of the brake and a second arm of the lever is disposed beneath the brake booster. The lever is configured such that rearward movement of the transmission due to a vehicle collision urges the first arm into contact with the brake booster and thereby rotates the lever such that the second arm urges the brake booster upwardly relative to the transmission. The upward movement of the brake booster thereby prevents the brake booster from being trapped between the transmission and structure of the vehicle such that it may cause undesirable intrusion of a brake pedal into the vehicle passenger compartment.

12 Claims, 4 Drawing Sheets

(56) References Cited

U.S. PATENT DOCUMENTS

| | | | |
|---|---|---|---|
| 6,269,900 B1 * | 8/2001 | Adams | B60R 21/09 |
| | | | 180/274 |
| 7,195,091 B2 * | 3/2007 | Rixon | B60T 7/065 |
| | | | 180/274 |
| 7,740,278 B2 * | 6/2010 | Kakuta | B62D 3/12 |
| | | | 280/777 |
| 8,544,589 B1 | 10/2013 | Rupp et al. | |
| 8,646,790 B2 | 2/2014 | Young et al. | |
| 8,991,903 B1 | 3/2015 | Alavandi et al. | |
| 9,174,679 B2 | 11/2015 | Klamser et al. | |
| 2007/0283690 A1 * | 12/2007 | Miller | B60R 21/09 |
| | | | 60/547.1 |
| 2011/0011664 A1 | 1/2011 | Baumann et al. | |
| 2013/0333376 A1 * | 12/2013 | Murayama | B60T 7/042 |
| | | | 60/545 |
| 2014/0062129 A1 | 3/2014 | Syed et al. | |
| 2017/0253220 A1 * | 9/2017 | Ishihara | G05G 1/32 |
| 2018/0229771 A1 * | 8/2018 | Sekine | B60K 1/00 |
| 2019/0009767 A1 * | 1/2019 | Meckenstock | B60T 17/18 |
| 2019/0009768 A1 * | 1/2019 | Meckenstock | B60T 7/065 |
| 2019/0039588 A1 * | 2/2019 | Somogyvari | B60T 17/00 |

\* cited by examiner

MOTOR VEHICLE TRANSMISSION WITH PIVOTING LEVER FOR RAISING A BRAKE BOOSTER DURING A COLLISION

CROSS-REFERENCE TO RELATED APPLICATIONS

This application claims foreign priority benefits under 35 U.S.C. § 119(a)-(d) to DE Application 10 2017 213 212.4 filed Aug. 1, 2017, which is hereby incorporated by reference in its entirety.

TECHNICAL FIELD

The invention relates to a motor vehicle with at least one transmission and at least one brake booster which is arranged in a normal position at least partially at the rear side offset with respect to the transmission.

BACKGROUND

A motor vehicle has a transmission for variable transmission of a drive power of a drive unit, such as an internal combustion engine, of the motor vehicle. The transmission housing is coupled rigidly to the drive unit, wherein an assembly formed as a result of this can be arranged in a frontal engine compartment of the motor vehicle. A brake booster which is in turn operatively connected to a brake pedal is generally arranged at rearwardly with respect to the transmission.

In the case of a frontal collision of such a motor vehicle with an object, the transmission may be displaced or forced rearwardly, toward a passenger compartment of the motor vehicle or a dashboard arranged therein. The transmission may be displaced so far rearwardly and with sufficient force that the it comes into contact with the brake booster and as a result of this also displaces the brake booster rearwardly, as a result of which the brake booster can become clamped between the transmission and the passenger compartment or a vehicle structure which holds the dashboard, such as a firewall. As a result of this, a load path is formed from the transmission via the brake booster and the brake pedal to the vehicle structure which holds the dashboard (firewall), which involves a high action of force on this vehicle structure. As a result of this, the vehicle structure or the dashboard held thereon can be deformed or displaced rearward to a significant extent in the event of a collision, which may increase the risk of injury for a person located in a front part of the passenger compartment.

U.S. Pat. No. 9,174,679 B2 relates to a deflection device for a frontal collision of a vehicle with a barrier.

U.S. Pat. No. 8,991,903 B1 relates to a forward assembly for a vehicle, having a frame longitudinal beam, a fender which is arranged in front of the frame longitudinal beam, a baffle plate with a front limb which extends outside the fender and is fastened thereon, and a rear limb which extends from an outer end of the front limb to the frame longitudinal beam, and a gripping bracket which is fastened to the frame longitudinal beam behind the rear limb and prevents the rear limb from sliding backwards in a collision.

U.S. Pat. No. 8,544,589 B1 relates to a device for turning a front wheel inward during an offset front impact between an impacting object and a vehicle U.S. Pat. No. 8,646,790 B2 relates to a frame structure which is configured so that it absorbs energy from frontal impacts and extends under a front part of the body frame.

US 2011/0011664 A1 relates to a vehicle with a crash detection device for detection of a crash event which introduces a force in one direction of action into the vehicle and with an acceleration device which interacts directly or indirectly with the crash-detection device for absolute acceleration of at least a partial mass of the vehicle in the event of a crash counter to the direction of action of the force introduction.

US 2014/0062129 A1 relates to an impact and absorption structure for a vehicle body.

SUMMARY

It should be pointed out that the features and measures listed individually in the following description can be combined with one another in any desired, technically expedient manner and highlight further configurations of the invention. The description characterizes and specifies the invention in conjunction with the figures. A frontal collision is, within the meaning of the invention, a collision which acts on the front region of the motor vehicle, and brings about at least one force component along the vehicle longitudinal axis (known to a person of skill in the automotive arts as the x-axis). Any lateral or rear collision scenario which applies such a longitudinal force are thus also encompassed. A collision can be an accident or any other type of collision of an object with the motor vehicle.

According to the invention, the brake booster can be raised or displaced upwards toward its collision position during a frontal collision of the motor vehicle by means of the displacement unit in such a manner that the brake booster is not clamped or trapped between the transmission and a vehicle structure disposed rearward of the brake booster which is located in its normal position, which vehicle structure holds, for example, a dashboard. As a result of this, up to a certain degree of rearward displacement of the transmission, the formation of a load path between the transmission and the stated vehicle structure can be prevented since the load path does not run through the brake booster displaced according to the invention. As a result of this, it is possible to prevent relatively early collision forces being transmitted to the stated vehicle structure. This prevents an early, significant, rearward deformation or displacement of the vehicle structure (such as a firewall separating the engine compartment from the passenger compartment) into the passenger compartment of the motor vehicle, which may significantly reduce the risk of injury for a person located in a front part of the passenger compartment. The motor vehicle according to the invention thus has improved passenger protection properties.

The disclosed structure also makes it possible that the transmission (or the assembly formed from the transmission and a drive unit of the motor vehicle connected thereto) can be arranged at a higher position within an engine compartment than is otherwise possible. This higher positioning of the assembly creates a higher degree of ground clearance which makes it possible to produce flatter motor vehicles with a lower roof height. The invention consequently increases the degree of freedom in the design of the motor vehicle, but could also improve its aerodynamic resistance which has an advantageous effect on energy savings during operation of the motor vehicle.

The displacement unit is arranged externally on the transmission, such as on an outer surface of a housing of the transmission. The motor vehicle may also have two or more displacement units which can engage or contact the brake booster at different locations thereon.

The motor vehicle can be in particular a passenger automobile. The transmission and the brake booster may be arranged jointly with a drive unit, for example, an internal combustion engine, in a frontal engine compartment of the motor vehicle. During normal vehicle operations and prior to a collision of the motor vehicle with the object, the brake booster in the normal or pre-collision position in which the brake booster may be arranged partially or entirely rearward of and spaced apart from the transmission.

The displacement unit functions exclusively mechanically, using kinetic energy inherent in a collision, so that no energy supply to the displacement unit is necessary which would increase the weight of the motor vehicle. Moreover, the displacement unit functions even in the event of a failure of a vehicle electrical system of the motor vehicle in the event of a collision, is therefore highly fail-proof and thus reliable in operation. According to this configuration, the displacement unit is activated solely by acting collision forces.

A further advantageous configuration provides that the displacement unit has at least one lever which is mounted on the transmission to be pivotable about a pivot axis arranged generally transversely with respect to a longitudinal axis of the vehicle (generally parallel with a lateral axis of the vehicle), the lever being generally U-shaped or C-shaped with the opening oriented toward the brake booster and having at least one first lever arm arranged at least partially forward of the brake booster and at least one second lever arm arranged at least partially rearward of the brake booster. When in the pre-collision position, the lever may be arranged spaced apart from the brake booster or alternatively may be in physical contact with the brake booster. If the transmission is displaced rearward, as in the case of a frontal collision, the lever mounted thereto is necessarily also displaced rearward. If the first lever arm positioned forward of the brake booster is in physical contact with the brake booster and if the transmission is displaced further rearward together with the lever, there necessarily arises a pivoting of the lever about the pivot axis, which may preferably be oriented generally parallel to the lateral axis of the vehicle. In this case, the lever is pivoted about the pivot axis in such a manner that the second lever arm (at least a portion of which is located below the brake booster) comes into physical contact with the brake booster from below. If, in the event of a continuing rearward displacement of the transmission, the lever is further pivoted by the physical contact between the first lever arm and the brake booster, the second lever arm pushes with increasing force from below against the brake booster until the booster is raised or displaced upwards or away from the ground.

The displacement force which can be applied with the lever can be adapted to the strength of a fastening with which the brake booster is mounted to a vehicle component so that the fastening is released, for example via at least one predetermined breaking point or the like, shortly before or after the displacement force has reached its maximum value. Alternatively, the fastening can be formed to be robust such that the brake booster can be displaced into its collision position without becoming detached from the vehicle component. The lever can be produced at least partially or completely from a metal, a metal alloy, for example, a steel, or a composite material. The displacement unit can also comprise two or more levers which can engage at different points on the brake booster. The pivot axis can be mounted via at least one radial bearing on the transmission or the lever.

The fact that the pivot axis about which the lever is pivotably mounted to the transmission is arranged generally transversely with respect to a longitudinal axis of the vehicle can mean that the pivot axis is arranged perpendicular to the longitudinal axis of the vehicle, as already stated above. Alternatively, the pivot axis may be aligned at an angle other than 90° with respect to the longitudinal axis of the vehicle in order, in individual load cases, to produce ideal contact between the lever and the brake booster to be displaced. It is constructive that, at the time of contact between the lever and the brake booster, the pivot axis is as transverse as possible to the displacement direction of the transmission in order to ensure an ideal pivoting of the lever and an optimum transmission of force between the lever and the brake booster. This may be advantageous if the transmission rotates about its vertical axis as a result of collision loads. For example, in the case of a frontal collision with a deformable barrier with 40% y-overlapping of the front end of the motor vehicle, only a longitudinal beam of the frame/sub-frame beam on one side of the vehicle is subjected to collision loads, the main load path into the engine or the transmission from the center of gravity of the engine or transmission is offset with respect to the longitudinal beam in the +y- or −y axis and generates a z-moment about the center of gravity of the engine. The engine therefore performs a z-rotation, i.e. a rotation about its vertical axis.

According to a further advantageous configuration, the two lever arms are arranged relative to one another in such a manner that form, on the side of the lever facing the brake booster, an acute angle (smaller than or equal to 90°) between them. As a result of this, physical contact with the second arm can already be produced at an early stage in a collision event, with the lever upon its activation by the brake booster in order to be able to displace the brake booster at an early stage and quickly into its collision position in the event of a collision. An obtuse angle can, however, alternatively also be enclosed between the two lever arms.

According to a further advantageous configuration, the second arm of the lever is formed to be longer than the first arm. The length of the respective arm is preferably adapted to the configuration of the brake booster and/or the relative position of the lever with respect to the brake booster.

A further advantageous configuration provides that a contact surface (that which faces the brake booster) of the lever is formed to be at least partially convex. As a result of this, robust contact can be ensured without tilting between the lever and the brake booster. The contact surface can slope towards the lateral edges of the contact surface running in the longitudinal axis of the lever or the contact surface in order to be formed in a convex manner.

Further advantageous configurations of the invention are disclosed in the subordinate claims and the following description of the figures. Therein

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Identical parts are always provided with the same reference numbers in the different figures, which is why these are generally also only described once.

Figure 1:
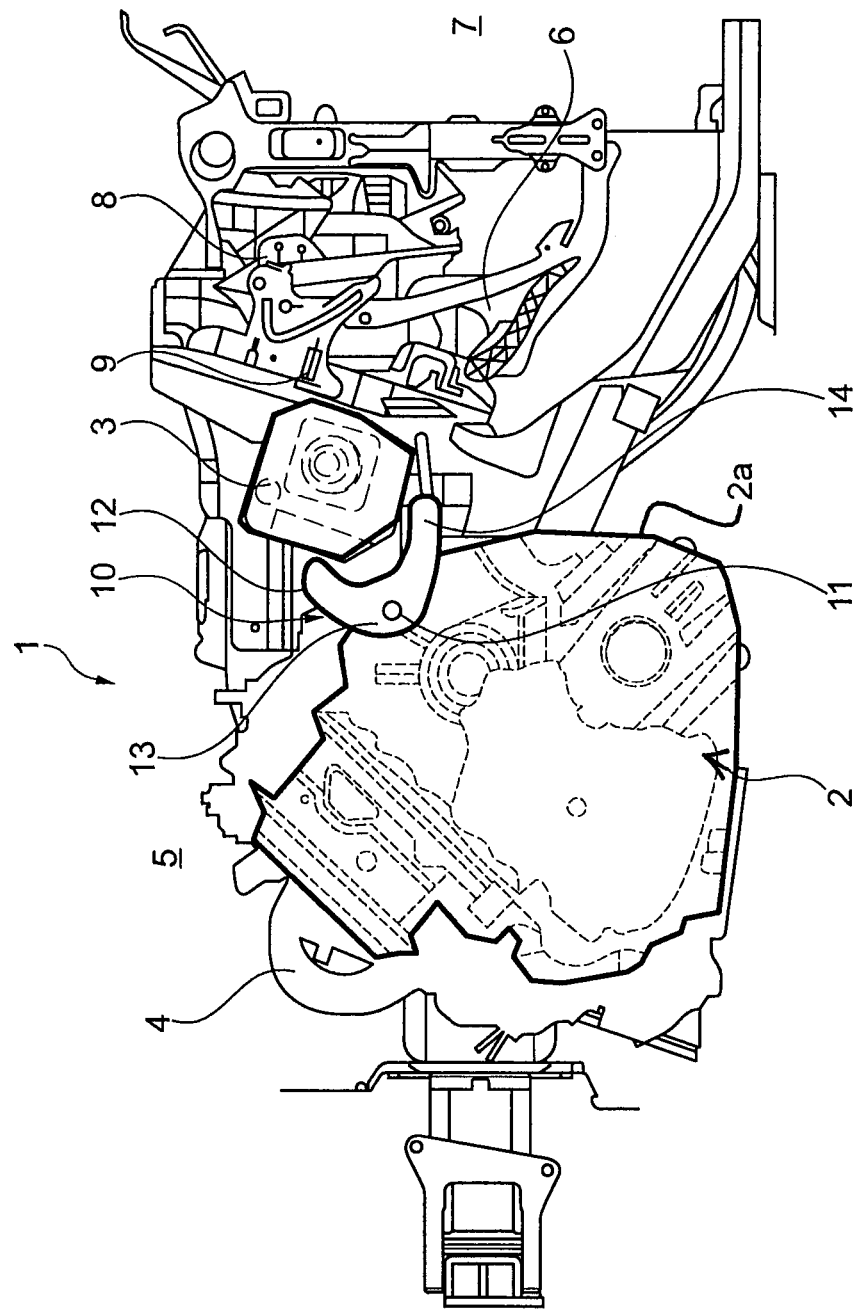
FIG. 1 shows a schematic sectional representation of an exemplary embodiment of a motor vehicle according to the invention with a displacement unit which is in a normal state.

FIG. 1 shows a schematic sectional representation of an exemplary embodiment of a motor vehicle 1 having a forward engine compartment 5 with a transmission 2 and a brake booster 3 operatively disposed therein. Transmission 2 and brake force booster 3 are shown arranged together with an internal combustion engine 4. The booster 3 is disposed in a conventionally-known position wherein at least a portion of the booster is directly behind (parallel with the vehicle x-axis) the transmission 2. As is well known in the art, the brake booster 3 is functionally connected to a brake pedal 6 which is arranged in a passenger compartment 7 of motor vehicle 1. A dashboard 8 is held by a vehicle structure 9 which is arranged rearward of the brake booster 3. Brake booster 3 may typically be arranged above brake pedal 6.

Figure 4:
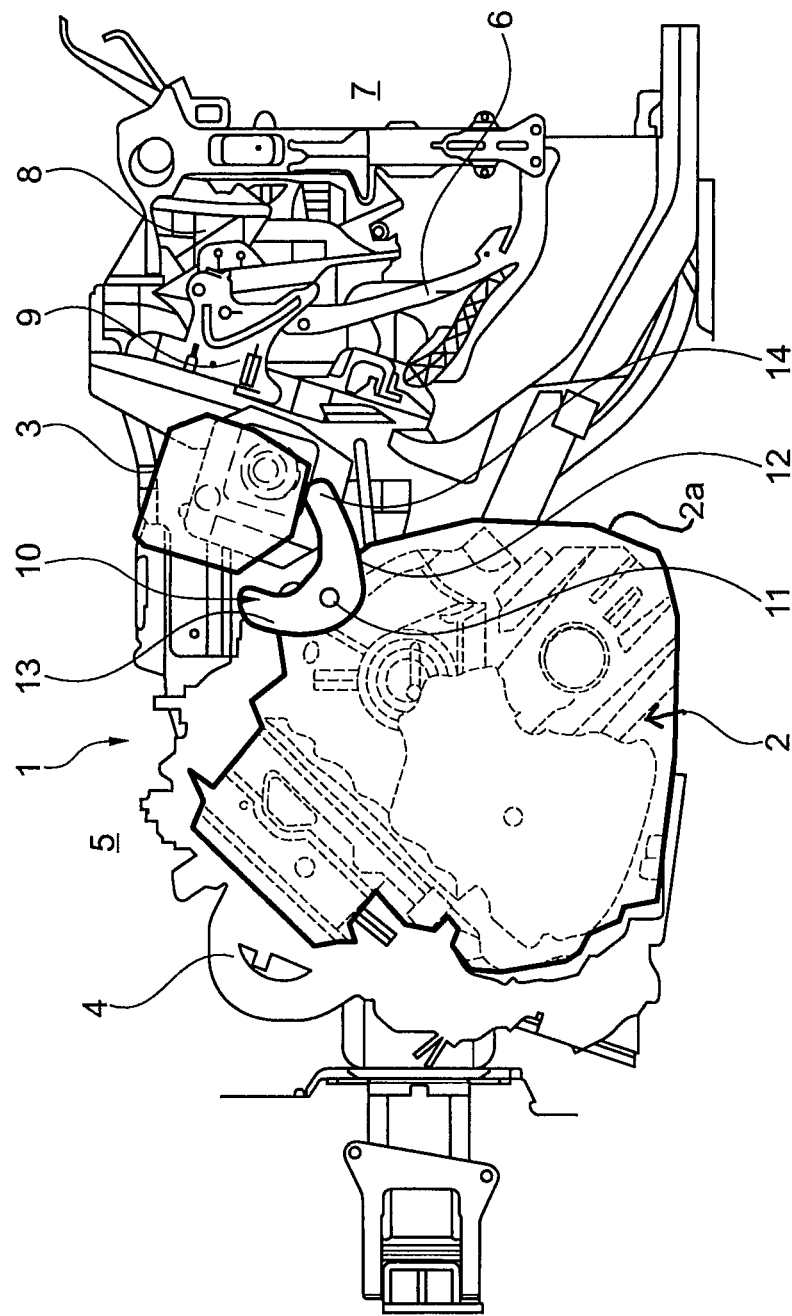
FIG. 4 shows a schematic sectional representation of the motor vehicle shown in FIG. 1 in a third collision state during or after the frontal collision.

A displacement unit 10 is moveably secured to the exterior of a housing 2a of the transmission 2 and is formed and arranged in such a manner that a rearward displacement of the transmission, such as occurs during a frontal vehicle collision, causes the displacement unit to displaces brake booster 3 upward (relative to the transmission 2 and to the vehicle overall) from the normal operating position (also referred to herein as the pre-crash position) shown in FIG. 1 into a collision position as shown in FIG. 4.

Displacement unit 10 comprises a lever 12 which is mounted to transmission housing 2a to be pivotable relative thereto about a pivot axis 11. The pivot axis 11 may be arranged generally transversely with respect to the vehicle, i.e. generally parallel with the vehicle y-axis. The term "generally parallel" is intended to be understood to mean that an angle between the pivot axis 11 and the vehicle lateral axis or y-axis is within a range of approximately 0° and 30°. The lever 12 may be formed on one side in a U-shape or C-shape, such that it is concave on a side of lever 12 facing rearwardly and toward brake booster 3.

Lever 12 comprises a first arm 13 and a second arm 14. When the transmission 2 and brake booster 3 are in their respective installed/operative positions in an engine compartment, the first arm 13 is disposed forward of the brake booster 3, and the second arm 14 is disposed such that at least a portion thereof is below the brake booster 3. The arms 13, 14 are arranged relative to one another in such a manner that the angle between them, on the side of lever 12 facing brake booster 3, is an acute angle (smaller than 90°). Second arm 14 may be longer than first arm 13.

Figure 2:
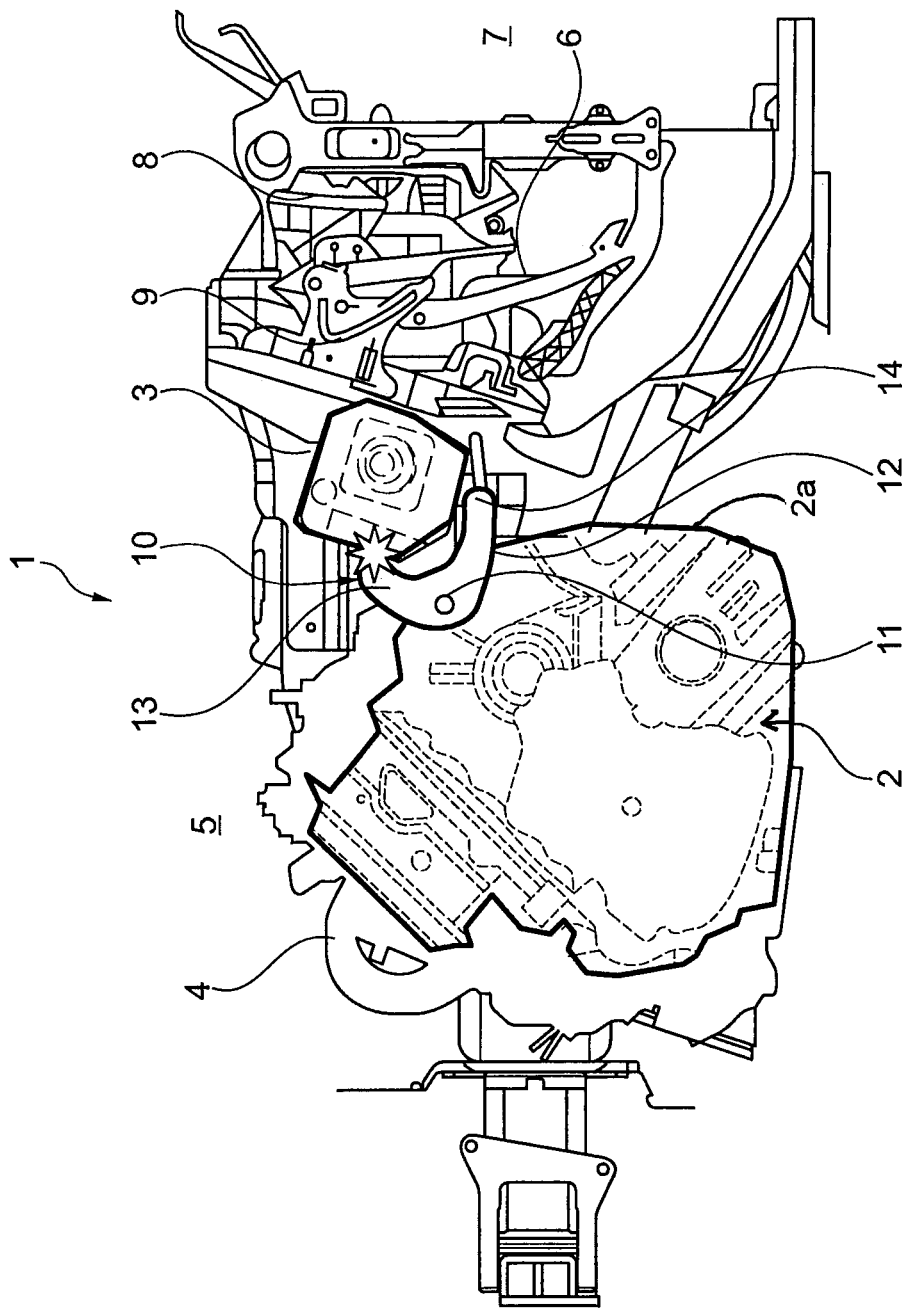
FIG. 2 shows a schematic sectional representation of the motor vehicle shown in FIG. 1 in a first collision state during a frontal collision.

FIG. 2 shows a schematic sectional representation of motor vehicle 1 shown in FIG. 1 in a first collision state during a frontal collision. As a result of the frontal collision, transmission 2 has been displaced rearwardly within the engine compartment and relative to the vehicle overall, i.e. to the right as depicted in FIG. 2. As a result of this rearward motion of the transmission 2, a distal end of first arm 13 has been brought into contact with a forward-facing surface of the brake booster 3.

Figure 3:
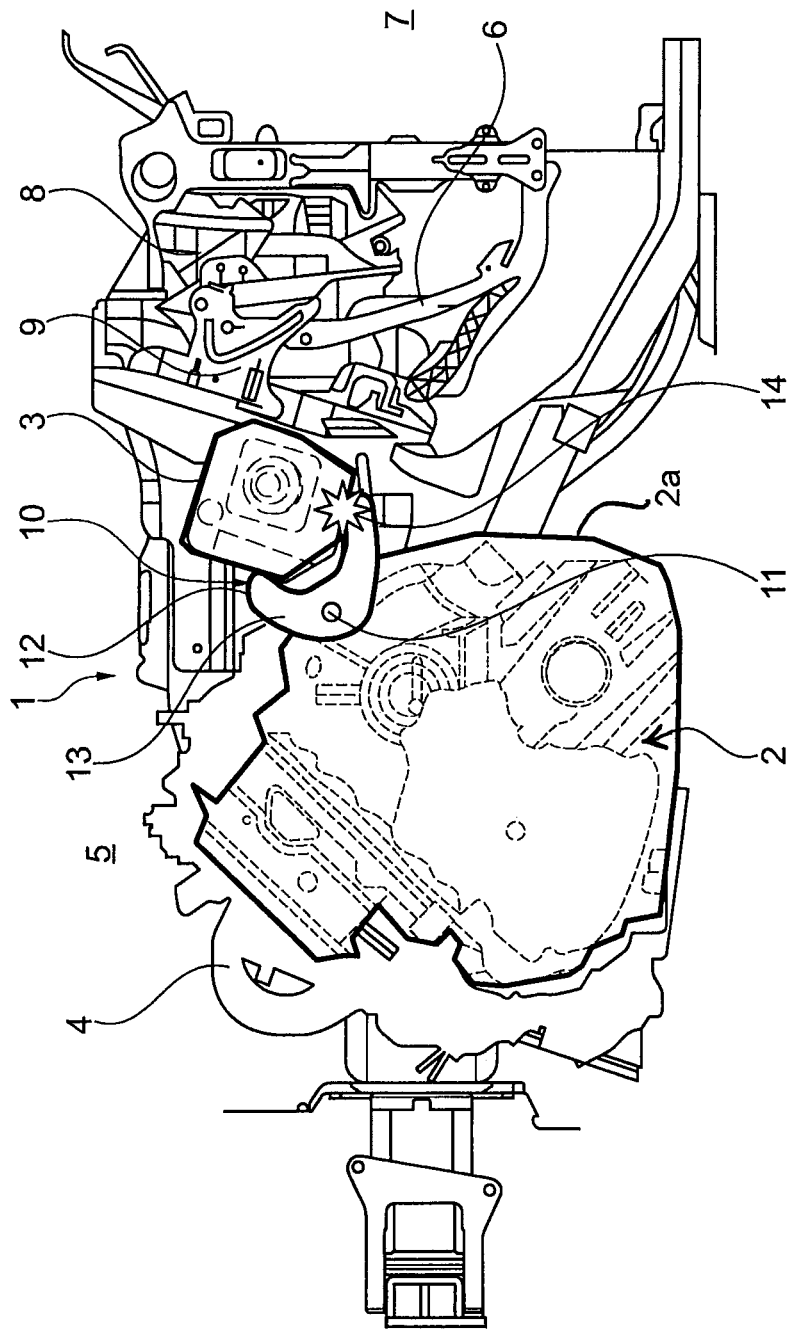
FIG. 3 shows a schematic sectional representation of the motor vehicle shown in FIG. 1 in a second collision state during the frontal collision.

FIG. 3 shows a schematic sectional representation of motor vehicle 1 shown in FIG. 1 in a second collision state during the frontal collision. Transmission 2 has been displaced further rearwardly (as compared with FIG. 2), as a result of which lever 12 has been pivoted in a counterclockwise direction about pivot axis 11 such that a distal end of second arm 14 is placed in contact from below with brake booster 3.

FIG. 4 shows a schematic sectional representation of motor vehicle 1 shown in FIG. 1 in a third collision state during or after the frontal collision. Transmission 2 has been displaced further rearwardly (compared with FIG. 3), as a result of which lever 12 has been pivoted further counterclockwise about pivot axis 11. As a result, second lever arm 14 presses or urges upwardly against brake booster 3 with sufficient force that the brake booster is displaced upwardly out of its normal, pre-collision position shown in FIGS. 1 to 3 into the collision position shown in FIG. 4. As a result of this, the formation of a load path via brake booster 3 between transmission 2 and vehicle structure 9 is reliably prevented.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
   a motor vehicle transmission; and
   a lever mounted to the transmission for pivoting movement relative thereto about a pivot axis, the lever having a pre-collision position wherein a first portion of the lever is disposed forward of a brake booster disposed rearward of the transmission and a second portion of the lever is disposed beneath the brake booster, the lever configured such that rearward movement of the transmission due to a vehicle collision urges the first portion into contact with the brake booster and thereby rotates the lever such that the second portion urges the brake booster upwardly relative to the transmission.

2. The apparatus of claim 1, wherein the pivot axis is arranged generally parallel with a lateral vehicle axis.

3. The apparatus of claim 1, wherein the first portion is part of a first arm and the second portion is part of a second arm, the first and second arms forming a C-shape with an opening of the C-shape oriented toward the brake booster.

4. The apparatus of claim 3, wherein the first and second arms are arranged relative to one another to form an acute angle oriented toward the brake booster.

5. A motor vehicle transmission comprising:
   a housing; and
   a lever mounted to the housing for pivoting movement relative thereto about a pivot axis, the lever having a pre-collision position wherein a first arm of the lever is disposed forward of a brake booster and a second arm is disposed beneath the brake booster, the first and second arms disposed such that rearward transmission movement due to a vehicle collision urges/forces the first arm into contact with the brake booster and thereby rotates the lever such that the second arm urges the brake booster upwardly relative to the transmission.

6. The apparatus of claim 5, wherein the pivot axis is arranged generally parallel with a lateral vehicle axis.

7. The apparatus of claim 5, wherein the first and second arms are disposed in a C-shape with an opening of the C-shape oriented toward the brake booster.

8. The apparatus of claim 7, wherein the first and second arms are arranged relative to one another to form an acute angle oriented toward the brake booster.

9. Apparatus comprising:
a motor vehicle transmission; and
a lever pivotingly mounted to the transmission and having a pre-collision position wherein a first lever portion is disposed forward of a brake booster and a second lever portion is disposed beneath the brake booster such that rearward transmission movement urges the first portion against the brake booster and pivots the lever such that the second portion urges the brake booster upwardly relative to the transmission.

10. The apparatus of claim 9, wherein the pivot axis is arranged generally parallel with a lateral vehicle axis.

11. The apparatus of claim 9, wherein the first portion is part of a first arm and the second portion is part of a second arm, the first and second arms forming a C-shape with an opening of the C-shape oriented toward the brake booster.

12. The apparatus of claim 11, wherein the first and second arms are arranged relative to one another to form an acute angle oriented toward the brake booster.

* * * * *